W. J. COSTELLO.
BEER DISPENSER.
APPLICATION FILED MAR. 16, 1912.
1,105,881.
Patented Aug. 4, 1914.
5 SHEETS—SHEET 1.
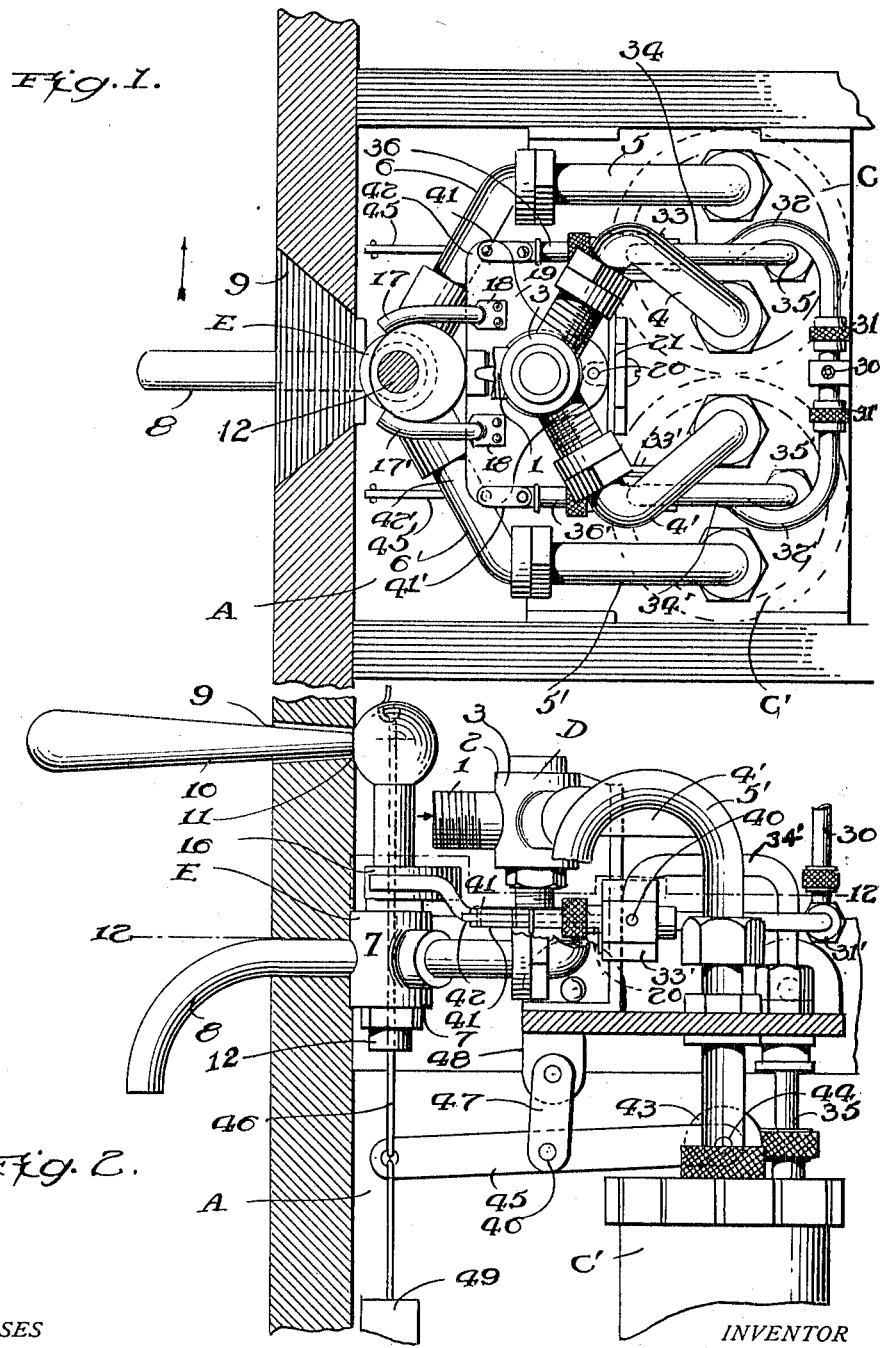
WITNESSES
Nancy E. Costello
L. F. Brock
INVENTOR
Walter J. Costello
by Scott Snyder Attorney

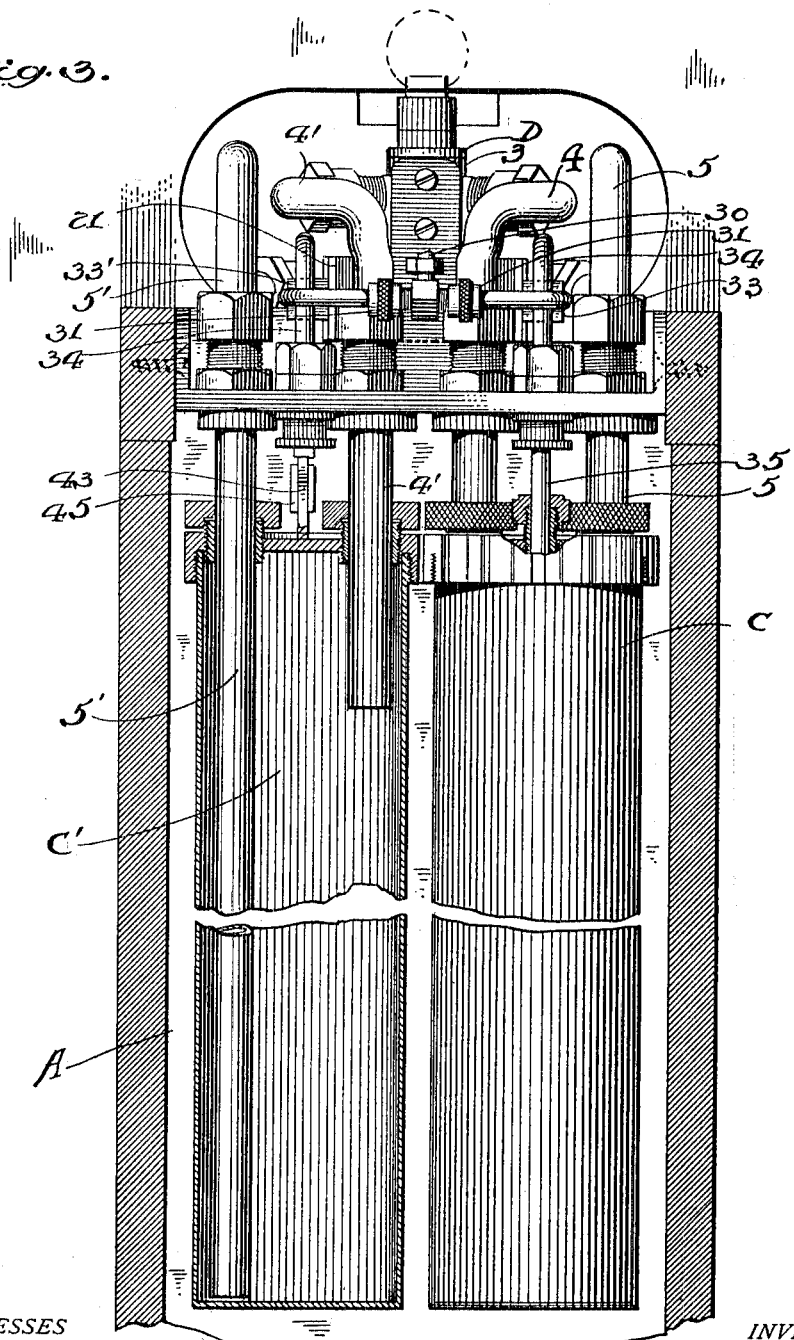

W. J. COSTELLO.
BEER DISPENSER.
APPLICATION FILED MAR. 16, 1912.
1,105,881.
Patented Aug. 4, 1914.
5 SHEETS—SHEET 3.
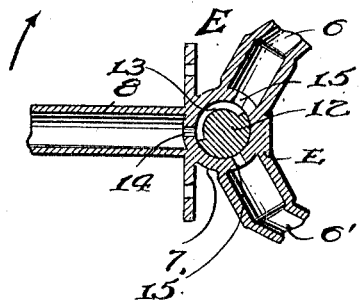
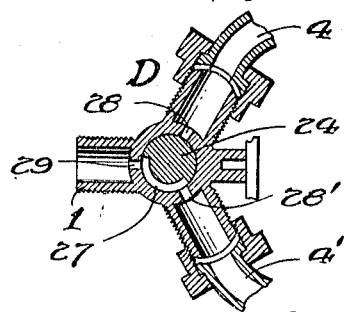
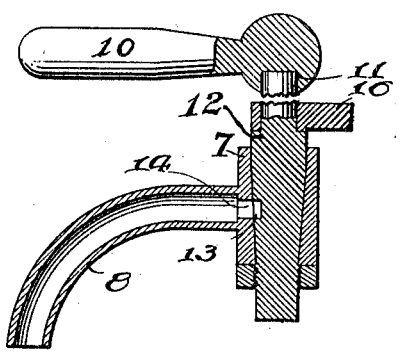
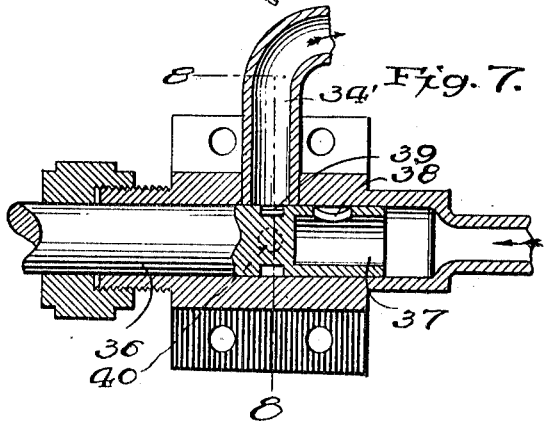
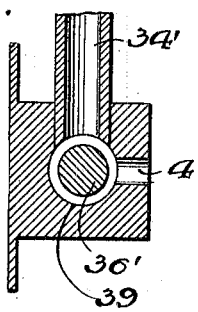
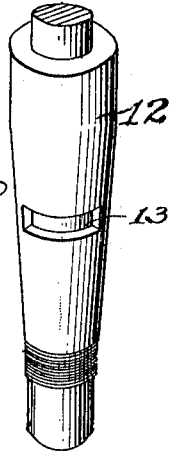
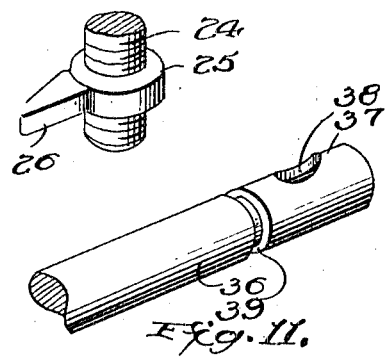
WITNESSES
Nancy E. Costello
L. P. Brock
INVENTOR
Walter J. Costello
by _____ Attorney W. J. COSTELLO.
BEER DISPENSER.
APPLICATION FILED MAR. 16, 1912.
1,105,881.
Patented Aug. 4, 1914.
5 SHEETS—SHEET 4.
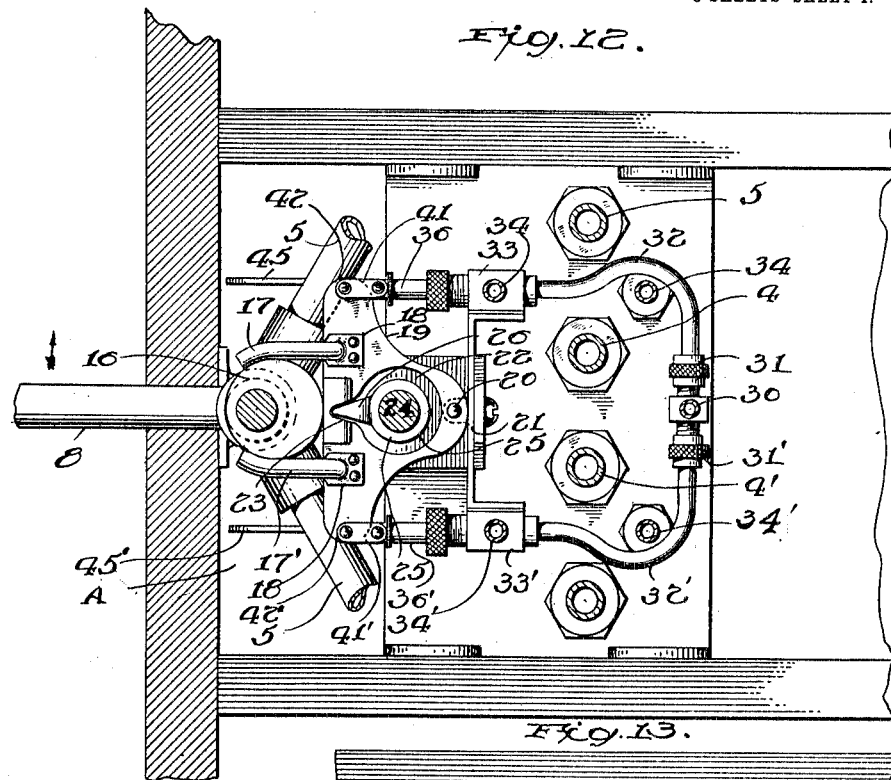
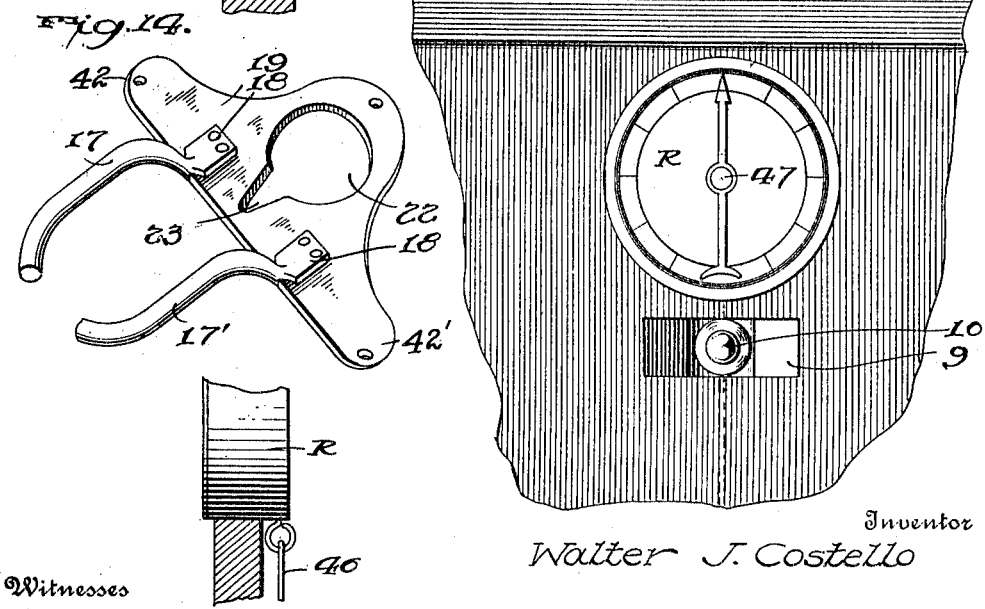
Inventor
Walter J. Costello
Witnesses
By
Attorney W. J. COSTELLO.
BEER DISPENSER.
APPLICATION FILED MAR. 16, 1912.
1,105,881.
Patented Aug. 4, 1914.
5 SHEETS—SHEET 5.
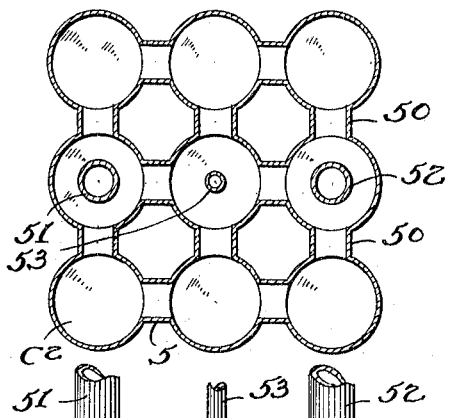
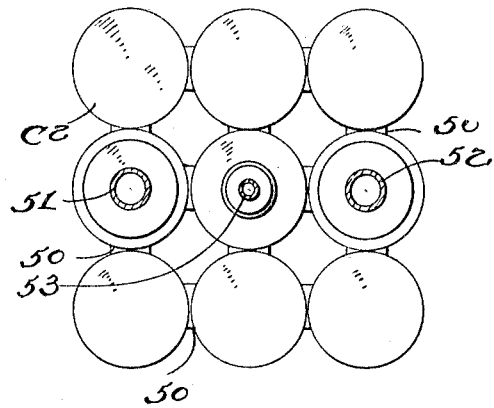
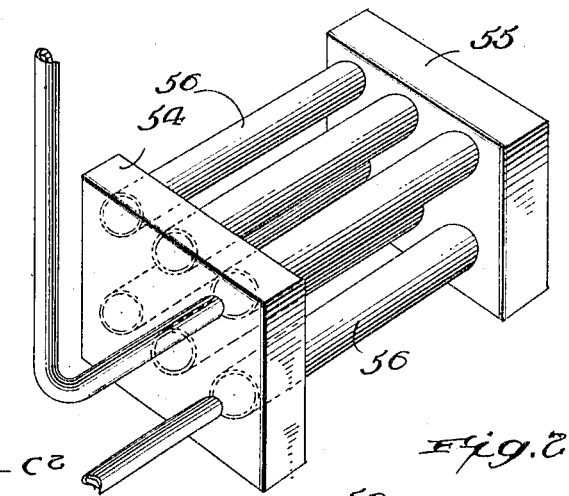
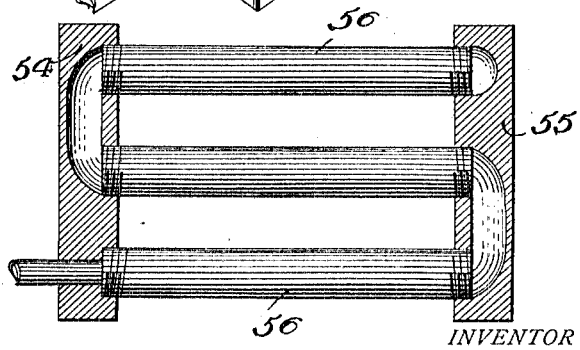
WITNESSES
Nancy E. Costello
L. F. Brock
INVENTOR
Walter J. Costello
by Geo. H. Snyder
Attorney

UNITED STATES PATENT OFFICE.

WALTER J. COSTELLO, OF WASHINGTON, DISTRICT OF COLUMBIA.

BEER-DISPENSER.

1,105,881.  Specification of Letters Patent.  Patented Aug. 4, 1914.

Application filed March 16, 1912. Serial No. 684,287.

*To all whom it may concern:*

Be it known that I, WALTER J. COSTELLO, a citizen of the United States, residing at Washington, in the District of Columbia, have invented certain new and useful Improvements in Beer-Dispensers, of which the following is a specification.

This invention relates to certain novel and useful improvements in apparatus for dispensing beer.

In carrying out my invention it is my purpose to provide an apparatus of the class described whereby the amount of beer contained in a keg or barrel may be accurately measured as it is drawn, thereby enabling the dispenser or proprietor to determine if such keg or barrel contains the proper quantity of beer called for.

A further object of my invention is the provision of containers designed to be located at the bar and under direct control of the dispenser, said containers in the present apparatus being in the nature of cylinders designed to receive beer under pressure from the barrel. By the use of such containers I am enabled to avoid the use of the ordinary coil or coils, thereby obviating the difficulty ordinarily incident to cleaning the latter.

It is also my purpose to provide a beer dispensing apparatus which may be applied to the ordinary bar structure without changing the structure of the latter.

I also aim to provide an apparatus embracing a plurality of containers at the bar all communicating with a common barrel or keg, together with controlling devices for simultaneously controlling the admission and outflow of the beer to and from the containers and from the bar faucet, the controlling means being actuated by a single handle or lever operated by the bar tender.

I also contemplate the provision of an apparatus for dispensing beer which will embody in its construction the desired features of simplicity, durability, compactness and convenience, coupled with economy in the cost of manufacturing and marketing.

With the above recited objects and others of a similar nature in view my invention consists in the construction, combination and arrangement of parts set forth in and falling within the scope of the appended claims.

In the accompanying drawings like characters of reference indicate like parts in all the views, and Figure 1 is a top plan view of a portion of a bar provided with an apparatus embodying my invention, with parts in section. Fig. 2 is a view of the same in side elevation, with parts in section. Fig. 3 is a rear view partly in elevation and partly in section. Fig. 4 is a horizontal sectional view taken through the main or faucet valve. Fig. 5 is a similar view of the valve controlling the inlet pipes to the containers. Fig. 6 is a vertical sectional view taken through the faucet valve. Fig. 7 is a similar view of one of the air valves of the containers. Fig. 8 is a view taken on the line 8—8 of Fig. 7. Fig. 9 is a perspective view of the faucet plug or valve. Fig. 10 is a perspective view of a portion of the stem of the valve controlling the inlet pipes of the containers. Fig. 11 is a detail of the air valve stem. Fig. 12 is a horizontal sectional view taken through the apparatus on the line 12—12 of Fig. 2. Fig. 13 is a view in elevation of a portion of the front of the bar showing the indicator located thereon. Fig. 14 is a perspective view of the operating plate for the valves of the containers. Fig. 15 is a view in side elevation of a portion of the indicator. Fig. 16 is a horizontal sectional view of a modified form of my invention. Fig. 17 is a top plan view of the structure shown in Fig. 16. Fig. 18 is a side view of the same. Fig. 19 is a perspective view of a still further modified form of container. Fig. 20 is a view partly in side elevation and partly in section of the structure shown in Fig. 19.

Referring now to the accompanying drawings in detail the letter A indicates the ice and water tank for the bar, within which is designed to be placed the major portion of my apparatus. In the present instance in connection with my apparatus I employ a plurality of containers, in this case two cylinders C and C'. These cylinders are arranged side by side and are designed to reciprocate vertically as hereinafter described.

The numeral 1 designates a pipe leading from the barrel containing the beer (not shown) said pipe being connected at 2 with the casing 3 of the valve D which valve controls the branch inlet pipes 4—4' leading to the containers C—C' respectively. From the containers C—C' lead the outlet pipes 5—5' the branches 6—6' of which terminate and communicate with the casing 7 of the faucet valve E from which projects the spout 8 through which the beer is drawn to any suitable receptacle.

The front of the ice tank is formed with a horizontal slot 9 of suitable dimensions to permit the faucet handle 10 to project there through and to be freely swung in an arc from side to side. The end of the handle within the tank is connected at 11 to the stem of the plug 12 of the valve E said plug having a semi-circular groove 13 formed therein and adapted at suitable times to be brought into register with the port 14 formed in the valve casing 7 and communicating with the spout 8. The valve casing 7 is also provided with the radial ports 15—15' affording communication with the pipes 6—6'. The upper end of the plug 12 is provided with the eccentric or cam 16 the toe of which is adapted to bear against the yoke plate arms 17—17' the inner ends of these arms being connected at 18 to yoke plate 19. The latter is preferably approximately triangular in form and is pivoted at 20 to the supporting plate 21. This yoke plate is formed with a central opening 22 into which merges the triangular slot 23.

The numeral 24 designates the valve stem of the three way valve D controlling the inlet pipes to the containers. This valve stem is provided with a collar 25 from which projects the tooth or dog 26 designed to project into the triangular slot of the yoke plate. The stem is further provided with a horizontally disposed segmental groove 27 adapted at predetermined times to bring into communication the ports 28—28' with the port 29 of the supply pipe 1 leading from the barrel.

Leading from a suitable source of air pressure is the pipe 30 to which is coupled as at 31—31' the branch air pipes 32—32' which are connected to the air valve casings 33—33'. From these casings lead the air pressure pipes 34—34' the opposite ends of said pipes communicating as at 35—35' with the cylinders C—C' respectively. Within the valve casings 33—33' are the cylindrical valves 36—36' each valve being horizontally disposed in its casing and is formed at its inner end with a tubular section 37 from which leads the circular port 38. The valve is also provided with a circumferential groove 39 alining with the inlet pipe to the valve casing and affording communication between the latter and the air exhaust port 40 when it is desired to permit the pressure to escape to the atmosphere as shown in Fig. 7. These valves 36—36' are connected at their outer ends through the medium of links 41—41' with the ends 42—42' of the yoke plate 19 so that when the plate is oscillated as hereinafter described the valves 36—36' will be horizontally reciprocated to bring the ports 38 into alinement with the pipes conducting the air to the air valve casings and thereby permitting the pressure of air to enter the cylinders, or to bring the circular grooves of the valves to alinement with the exhaust ports to permit the relief of the air pressure.

As has been heretofore mentioned the cylindrical containers are designed to move up and down in the tank, being guided in such movement by the sections of the inlet and outlet pipes projecting into the same. Each cylinder has projecting from the top or head thereof a lug 43 to which is pivotally connected as at 44 one end of the vertically swinging lever 45 said lever being fulcrumed as at 46 on the link 47 which link is suspended from the bracket arm or lug 48. To the outer or free end of the lever 45 is suspended the weight 49 normally tending to pull the lever downward and consequently the cylinder or container upward against the weight of the liquid within the latter. The free end of the lever 45 is also connected through the rod 46 with the shaft 47 of the indicator or register R. This register may be of any approved type or form to indicate and register the quantity of liquid drawn through the faucet and consequently is only shown conventionally as I wish it to be understood that I do not limit myself to any specific type of indicator or register.

From the above description taken in connection with accompanying drawings the construction and operation of the apparatus will be readily apparent to those skilled in the art. When the device is installed and properly connected to the barrel or keg of liquid, and is ready for use, the pressure is placed on the liquid in the barrel in the ordinary manner as by means of an air pump or the like, and such liquid is forced through the supply pipe 1 to the valve D and passes thence through the inlet pipe which is in communication with the supply pipe by means of the segmental groove 27, to the cylinder connected to said inlet pipe. It is to be understood that when the inlet pipe of one of the cylinders is in position to receive and conduct the liquid from the supply pipe, the inlet pipe of the other cylinder is cut off or closed as will be readily understood by reference to Fig. 5. In other words while one tank is being filled the other tank, or that which is being emptied is cut off from the source of supply. Assuming one of the cylinders to be thus filled with the liquid, if the handle 10 be swung to the left as indicated by the arrow to draw the liquid from the full cylinder C such movement will rotate the plug valve 12 and open communication between the spout of the faucet and the outlet pipe 6 see Fig. 4. At the same time the cam 16 on the stem of the valve 12 will bear against the arm 17' and swing the yoke plate 19 so as to open the air valve 33 and admit air pressure through the air pipe 32 to the cylinder. Simultaneously the air valve of the opposite cylinder will be moved in the opposite direction to permit the air within such cylinder to exhaust and thereby allow of the liquid to enter the empty cylinder so that the latter may be filling while the companion cylinder is being emptied. As the cylinder C is emptying and the weight is consequently being decreased, such cylinder is drawn upward by the action of the weight 49 on the lever 45, the lever in its movement causing the register R to indicate the quantity of liquid drawn from the cylinder. When one cylinder has been emptied in this manner the faucet is swung in the opposite direction or to the right, and the other tank which has undergone the process of filling, while its companion was being emptied is now placed in drawing communication with the faucet, and simultaneously the tank which has been emptied will in turn refill.

In Figs. 16, 17, and 18 I have shown a modified arrangement of containers or cylinders, in this case employing a bank or group of cylinders C² all communicating through short sections of pipes 50 while 51 designates a common fluid inlet pipe, 52 a common fluid outlet pipe, and 53 the air pressure pipe.

In Figs. 19 and 20 instead of employing a relatively large cylinder I make use of a plurality of heads or boxes 54 and 55 connected by sections of straight tubing 56. It will be noted however that both the modified forms of containers are based upon substantially the same principle as shown in my preferred form.

While I have herein shown and described one preferred embodiment of my invention, I wish it to be understood that I do not limit myself to all the precise details of construction herein set forth by way of illustration, as modification and variation may be made without departing from the spirit of the invention or exceeding the scope of the appended claims.

What I claim is:—

1. The combination with a plurality of movable containers, of supply pipes leading thereto, delivery pipes leading from the containers, valve mechanism for controlling the flow through the supply pipes to the containers, valve mechanism for controlling the flow from the containers through the delivery pipes, means for admitting air pressure to the containers, and unitary means under control of the operator for simultaneously actuating the valve mechanisms and the air admission means to all the containers.

2. The combination with a plurality of movable containers, of means for admitting the fluid to the containers, valve mechanism whereby the fluid may be admitted to one of said containers and simultaneously drawn from another of the containers, air conducting means for each of the containers, and mechanism for operating the valve mechanism and controlling the air conducting means.

3. The combination with a plurality of containers, of means connecting said containers with a suitable source of fluid supply, means for permitting the fluid to pass into one of said containers while it is being withdrawn from another of the containers, air conducting means for the containers, valve mechanism for the fluid supply means, valve mechanism for the air conducting means and a single element for controlling the operation of both valve mechanisms.

4. The combination with a plurality of containers, of means connecting said containers with a suitable source of liquid supply, means for delivering the liquid from the containers means for admitting air pressure to said containers at predetermined times, and common operating means for controlling the flow of the liquid to and from the containers and simultaneously controlling the air admission means.

5. The combination with a plurality of containers, of means connecting said containers with a suitable source of liquid supply, valve mechanism common to the supply means of the containers, means for conducting the liquid from the containers, valve mechanism for controlling said conducting means, means connected with a suitable source of air supply for supplying air under pressure to the containers at predetermined times, valve mechanism for said air supply means, and a single operating mechanism under the control of the operator for actuating the valve mechanisms of the liquid supply means the liquid conducting means and the air supply means.

6. The combination with a plurality of movable containers, of means for supplying liquid to said containers from a suitable source of supply, means for delivering the liquid from the containers to a common point of discharge, valve mechanism for the supply means, valve mechanism for the delivery means and a single controlling mechanism under the control of the operator for actuating the valve mechanism of one container to admit the supply of liquid thereto and simultaneously actuating the delivery mechanism of a second container for permitting the flow of liquid therefrom.

7. The combination with a plurality of containers, of means for supplying liquid to the containers connected to a suitable source of liquid supply, delivery means for conducting the liquid from the containers, valve mechanism common to the supply means of all of said containers, valve means common to the delivery means of all of said containers, means for admitting air under pressure to said containers, operating mechanism for actuating the supply controlling valve mechanism of one container, and simultaneously actuating the controlling valve of the delivery means of the other container, and also actuating the mechanism controlling the air supply of the containers.

8. A combination with a pair of movable containers, one of which is adapted to rise as liquid is drawn therefrom, while the other correspondingly falls as the liquid is supplied thereto, means for supplying a liquid to the containers, delivery means leading from the containers, mechanism for controlling the flow of liquid to and from the containers, and an element manually controlled by the operator for actuating the controlling mechanism.

9. A combination with a movable container, a supply pipe leading to the container, a delivery pipe leading therefrom, an air conducting pipe for admitting air under pressure to the container, a delivery faucet connected to the delivery pipe, valve mechanisms for the supply pipe, the delivery pipe and the air conducting pipe, and a single manually operated element for controlling said valve mechanisms.

10. The combination with a tank of a plurality of movable containers located therein, a liquid supply pipe leading to each container, a controlling valve common to all of the supply pipes of the containers, a delivery pipe leading from each container, a valve common to all of the delivery pipes of the containers, an air conducting pipe for each of said containers, a valve for each of said conducting pipes, an operating member under control of the operator for actuating the valve of the delivery pipes, a cam actuated by said member, a movable element actuated by said cam and adapted in its movement to operate the valve of the supply pipes, and simultaneously to actuate the valves of the air pipes.

11. The combination with a tank of a plurality of movable containers, inlet or liquid supply pipes for all of said containers, delivery pipes for all of said containers, air supply pipes for all of said containers, valve mechanism common to the supply pipes, valve mechanism common to the delivery pipes, a valve for each of said air pipes, and a faucet connected to the delivery pipes and including a handle adapted when actuated to operate the valve mechanism of the delivery pipes, of the supply pipes and of the air pipes.

In testimony whereof I affix my signature in presence of two witnesses.

WALTER J. COSTELLO.

Witnesses:
N. CURTIS LAMMONDS,
GEO. H. SNYDER.

---

Copies of this patent may be obtained for five cents each, by addressing the "Commissioner of Patents, Washington, D. C."